Sept. 8, 1959  W. B. EDDISON  2,903,156
SEAL OPENING AND TRANSFERRING MECHANISM
Filed Feb. 3, 1954  5 Sheets-Sheet 4

INVENTOR.
William Barton Eddison
BY
ATTORNEYS.

Sept. 8, 1959 W. B. EDDISON 2,903,156
SEAL OPENING AND TRANSFERRING MECHANISM
Filed Feb. 3, 1954 5 Sheets-Sheet 5

FIG.11.

INVENTOR.
William Barton Eddison
BY
*Andrus & Scaler*
ATTORNEYS.

United States Patent Office 2,903,156
Patented Sept. 8, 1959

2,903,156

SEAL OPENING AND TRANSFERRING MECHANISM

William Barton Eddison, Irvington, N.Y., assignor to Gisholt Machine Company, Madison, Wis., a corporation of Wisconsin Application February 3, 1954, Serial No. 407,846

16 Claims. (Cl. 221—211)

This invention relates to seal opening and transferring mechanism adapted to strip flat folded seals from a magazine and to simultaneously open and transfer the same.

The invention has been applied to the stripping of individual seals from a magazine of seals, as in apparatus for applying tubular shrink fit regenerated cellulose seals to bottle tops and the like.

The invention utilizes the principle of spear opening described and claimed in application Serial No. 270,838 filed February 9, 1952, now Patent No. 2,747,769, by Warren E. Erickson for Seal Stripping and Opening Device and assigned to a common assignee herewith.

Where the spear has been mounted on a reciprocating support as shown in said application a problem arises as to speed of operation of the apparatus. Further problems arise in clamping of the seal on the stripper and releasing the seal for pickup by transfer mechanism.

The present invention solves the several problems whereby a substantial increase in speed of operation is obtained.

According to the invention the individual seal is first stripped from the magazine and then a spear mounted on a rotary member enters the seal and picks it off from the stripper and carries it to a two finger transfer mechanism. The stripper includes vacuum means to carry a seal from the end of the magazine to a pick-off station where it retains the seal until the spear enters it and the seal is clamped thereon. The rotary member has means to clamp the seal to the spear during rotation and the rotary member is made to dwell during the clamping and unclamping process occurring at the time of pick-off and at the time of delivery to the two finger head.

The construction is such as to provide for the use of easily lubricated rotary bearings as against slide bearings and to utilize a harmonic continuous drive which gives successive dwells with intermediate periods of smooth acceleration and deceleration for the seal.

The accompanying drawings illustrate in principle the best mode contemplated for carrying out the invention.

In the drawings:

Fig. 11 is a schematic showing of the drive.

Figure 1:
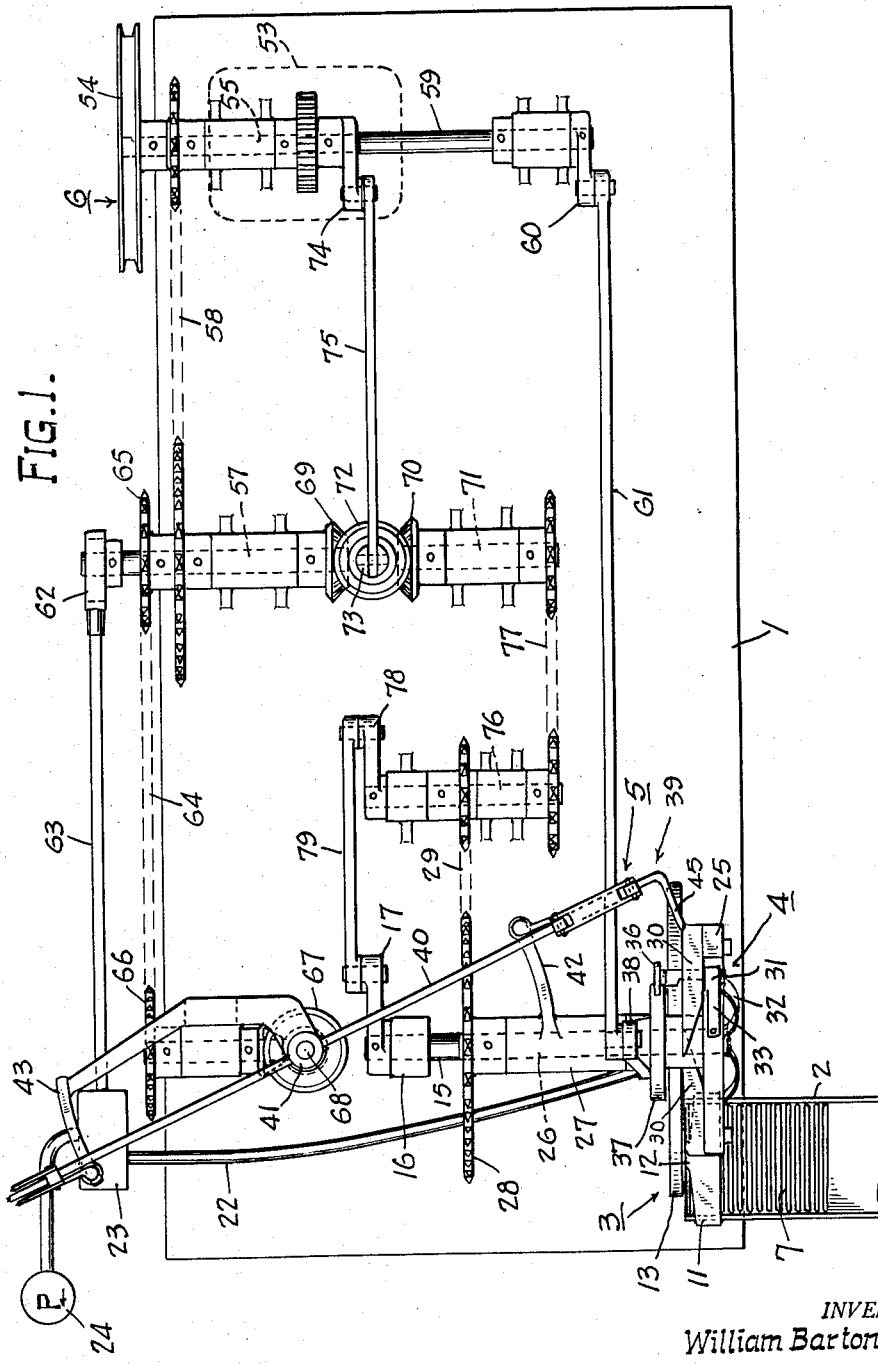
Figure 1 is a top plan view of the machine with some parts shown schematically.
Figure 2:
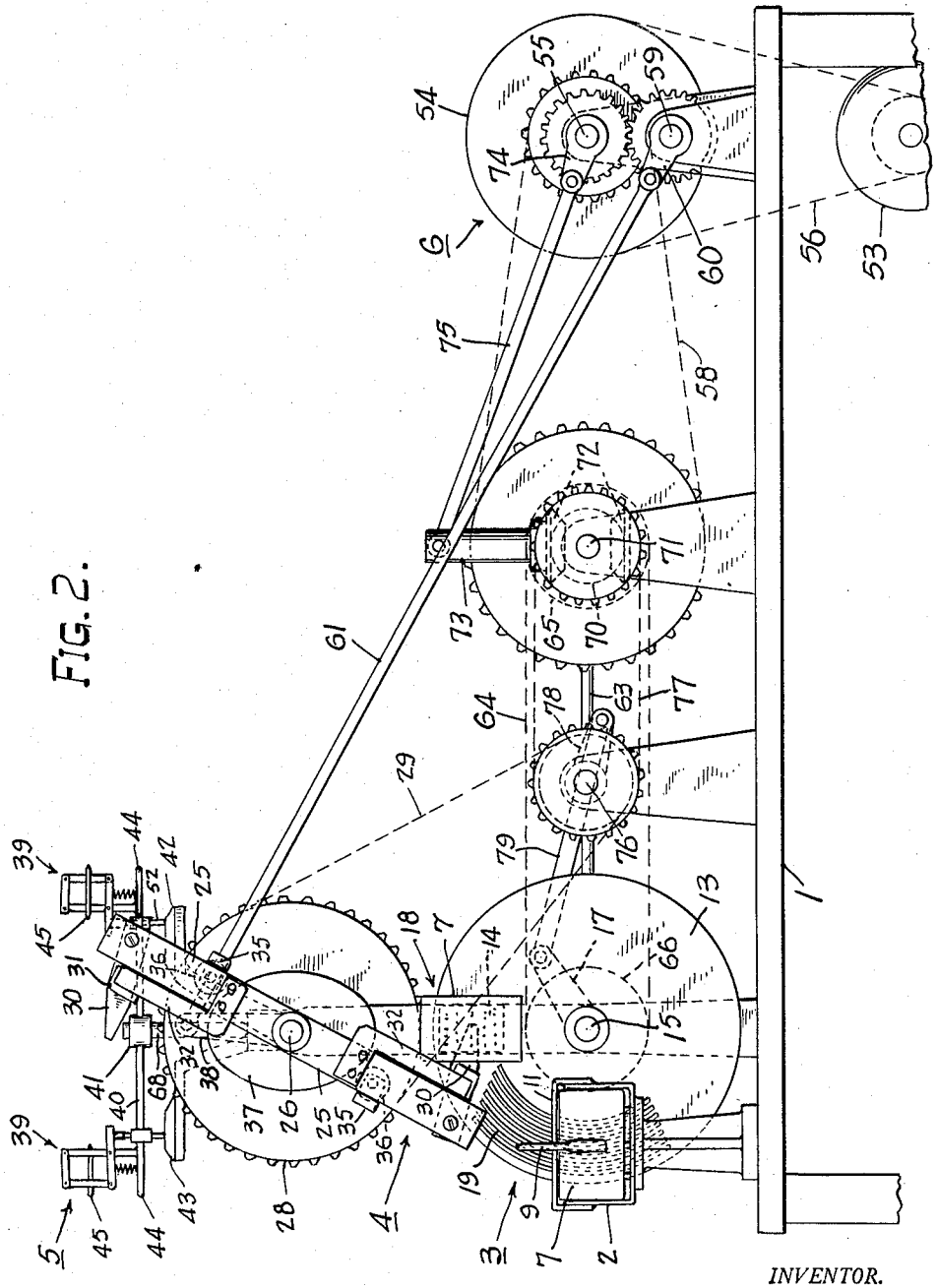
Fig. 2 is a front elevation of the machine.
Figure 3:
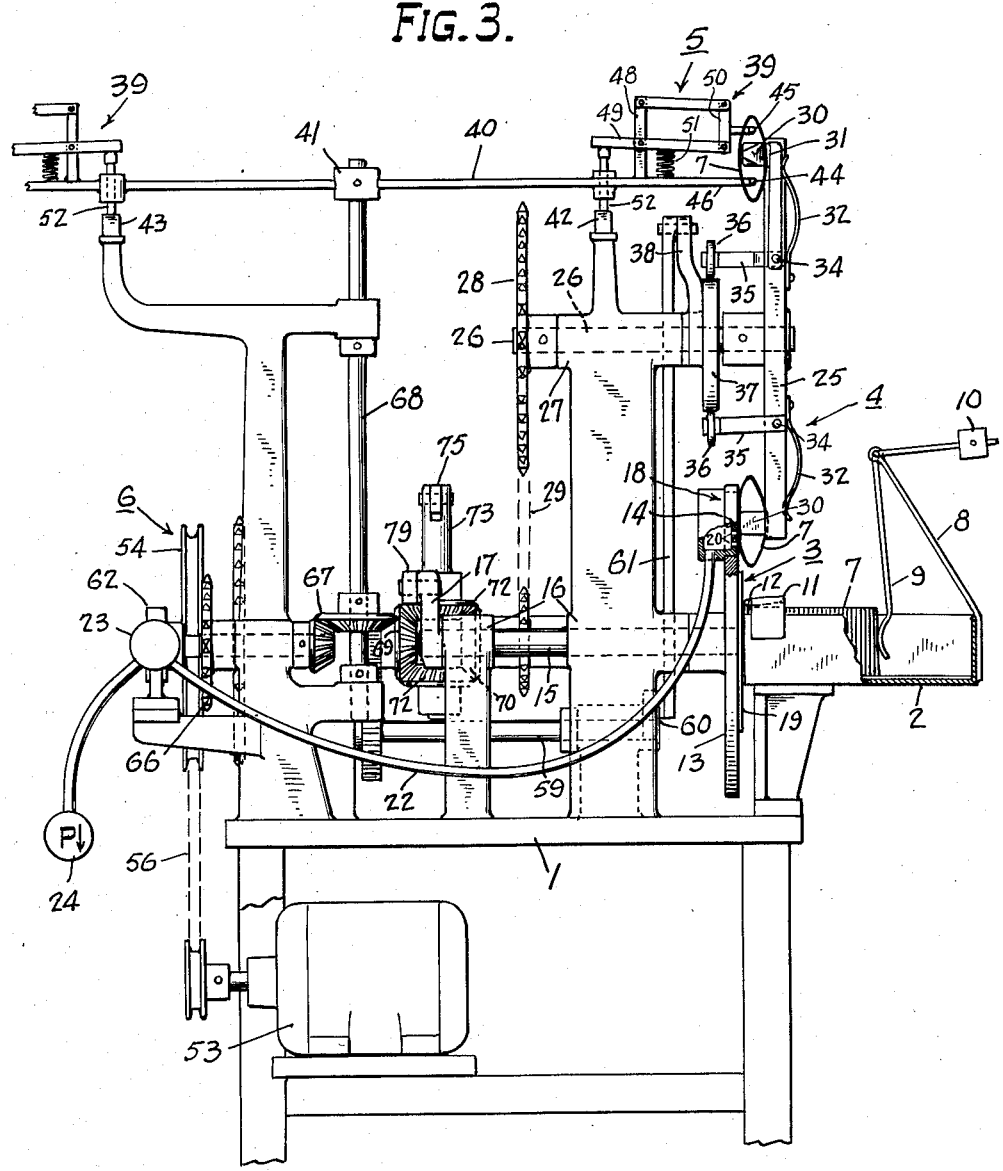
Fig. 3 is an elevation of the left side taken from Fig. 2.
Figure 4:
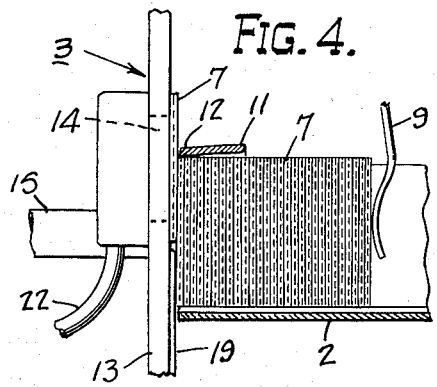
Fig. 4 is a detail view of the stripping end of the magazine showing the stripping of a seal therefrom.
Figure 5:
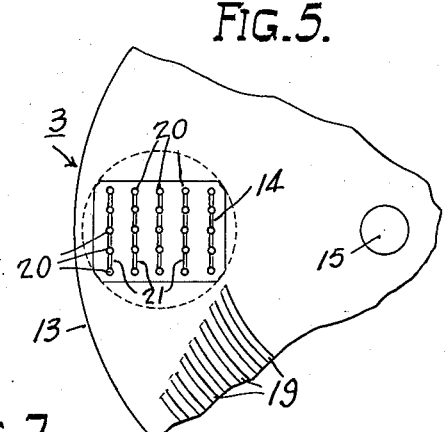
Fig. 5 is a face view of the stripper block.

The mechanism of the invention illustrated in the drawings, comprises in general, a base 1 supporting a seal magazine 2, a stripper assembly 3, a pick-off mechanism 4, a transfer mechanism 5, and the drive 6.

The magazine 2 comprises a trough of a size to conveniently receive and hold a pack of seals 7 with each seal disposed upright on a slit edge. The seals 7 are tubular and are folded flat in the pack.

The inner end of the magazine 2 constitutes the stripping end where the seals 7 are stripped from the pack one by one in rapid succession.

The outer end of the magazine 2 is provided with an upright arm 8 which pivotally carries a bell crank lever 9 having one end pressing against the end seal of the pack in the magazine and the other end carrying a weight 10 adapted to constantly bias the lever in a direction to apply a predetermined force to the pack urging the seals toward the stripper end of the magazine.

At the stripper end of the magazine 2 the seals 7 pass under a top guide member 11 extending across the top of the trough and which aligns the seals ready for stripping. The guide has a central tongue 12 extending toward the stripper mechanism 3.

The stripper 3 comprises a rotationally oscillating disc 13 facing the inner end of the magazine 2 and carrying a stripper member 14 on the face thereof near the outer circumference of the disc.

Disc 13 is mounted on the forward end of a shaft 15 suitably supported in bearings 16 and driven by a crank 17 adapted to oscillate the disc through approximately 90° to effect alternate registration of stripper member 14 with magazine 2 and with a pick-off station 18.

The surface of disc 13 has a series of circumferentially extending raised ridges 19 which support the end seal in the magazine 2 as the disc oscillates. The ridges 19 should come close to the edge of the guide tongue 12 and to the bottom of the magazine trough to prevent passage of a seal therebetween. Where, for instance, the seal has a total thickness for its two walls in the flat folded state of approximately .030″ plus or minus .006″, the space between the tops of ridges 19 and the member 12 may be set at about .010″, and the ridges may have a height of approximately .030″ on the face of disc 13.

The stripper member 14 comprises a vacuum block which is inserted in an opening in the disc 13 with the face of the block substantially flush with the face of the disc. The block 14 has a plurality of distributed passages extending through the face thereof and providing holes 20 in the face of the block. Small grooves 21 in the face of the block join the holes 20 to provide a continuous vacuum network for securing a seal to the face of the block.

The stripper member block 14 is hollow and connects on the back side of disc 13 with a suitable flexible hose 22 leading from a slide valve 23 which connects the same alternately to a source of vacuum represented as a suction pump 24, and to the air.

The stripper member 14 is disposed in a tangential direction normal to the radius of disc 13 and is adapted to index vertically with the end seal in magazine trough 2 and horizontally at the pick-off station 18.

The pick-off station for disc 13 is at the top and the disc oscillates as described to alternately strip seals from the end of the magazine 2 and deliver the same to the pick-off station.

As stripper member 14 registers with the magazine 2 the valve 23 opens to connect holes 20 thereof with suction pump 24 so that the end seal 7 in the magazine is securely drawn to the face of the block. The suction is maintained by valve 23 and pump 24 throughout the next rotary movement of disc 13 wherein the seal 7 is raised to the pick-off station 18. As the pick-off occurs and as soon as the seal is clamped, the valve 23 closes and relieves the suction on the seal by connecting holes 20 to the open air. Valve 23 remains closed against suction during return of stripper member 14 to magazine 2.

The pick-off mechanism 4 comprises a rotary wheel represented by two radial arms 25 fixed upon the end of a shaft 26 mounted in suitable bearings 27. The rear end of shaft 26 carries a sprocket 28 which receives a drive chain 29 for rotating the arms 25.

The outer end of each arm 25 carries a spear 30 which is adapted to pass the pick-off station 18 for disc 13 and to enter the slit seal 7 and open the same while the seal is held by the vacuum block 14 on the disc. The vacuum is released as soon as spear 30 fully enters the seal and is clamped thereto, and the seal is then carried by the spear from the pick-off station at the bottom of the circumferential rotary path of the spear, and upwardly to the transfer station at the top of the rotary path of the spear.

During this travel of the seal 7 on spear 30, the seal is clamped to the spear by a clamp plate 31 biased toward the forward side of the spear by means of a leaf spring 32 carried by the corresponding arm 25.

The clamp plate 31 is carried by the outer end of a clamp arm 33 secured at its inner end to a pivot pin 34 passing through the corresponding arm 25 and which has a short transverse lever arm 35 secured to the opposite end thereof. Lever 35 carries a roller 36 which rides on the circumference of a cam disc 37 mounted to oscillate upon the axis of shaft 26.

Cam disc 37 has its vertical diameter greater than its horizontal diameter so that at the vertical position of the arms 25 the rollers 36 riding upon cam 37 will force levers 25 and clamp arms 33 against springs 32 to separate clamp plates 31 from the corresponding spears 30 and permit entrance of the spear into a seal 7 at the lower take-off station and removal of a seal 7 from the spear at the upper transfer station.

The oscillation of cam disc 37 is effected to provide positive actuation of the clamps while the spears 30 are dwelling at the pick-off station and the transfer station. For this purpose a crank 38 is secured to the back side of cam disc 37 and is actuated as hereinafter described in synchronism with the rotation of the arms 25 to oscillate the cam disc 37 through about 30°.

At the transfer station the seal 7 is picked up by the transfer mechanism 5 which comprises a two finger head 39 on the outer end of an arm 40 secured to a rotating hub 41. There are two arms 40 corresponding to arms 25, and each arm 40 has a head 39 thereon.

The hub 41 is driven continuously at a constant rotational rate and heads 39 successively pass a fixed cam 42 disposed beneath the same as they pass the transfer station to pick up a seal 7, and another cam 43 similarly disposed as they pass the discharge station where the seal is picked up by a final head (not shown) that applies it to a bottle top.

The heads 39 are constructed with two forwardly extending fingers 44 and 45 adapted to enter and hold a seal thereon for transfer purposes. The fingers 44 and 45 are parallel and are movable relatively toward and away from each other with finger 45 disposed above finger 44 to provide for closing of the fingers together during loading and unloading of the seal, and for separating of the fingers to stretch the seal thereon at other times.

Figures 6, 7, 8:
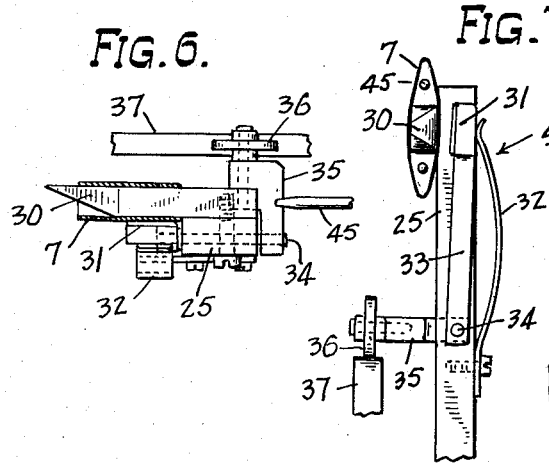
Fig. 6 is a detail view of a spear and its support viewed from the end of the support.
Fig. 7 is a detail section showing actuation of the clamp in releasing the seal.
Fig. 8 is an enlarged detail perspective of the two finger transfer head.

For this purpose, as shown in Fig. 8, finger 44 is carried by an arm 46 and finger 45 is carried by an arm 47. The arms 46 and 47 extend generally parallel to arm 40 and upper arm 47 is pivotally carried by a post 48 on the lower arm 46.

An actuating lever 49 is pivoted to post 48 and extends between arms 46 and 47 generally parallel thereto. The outer end of lever 49 is secured to the arm 47 by a link 50 and a compression coil spring 51 is disposed between lever 49 and arm 46 to bias the lever upwardly thereby tending to separate fingers 44 and 45 at all times.

Figure 9:
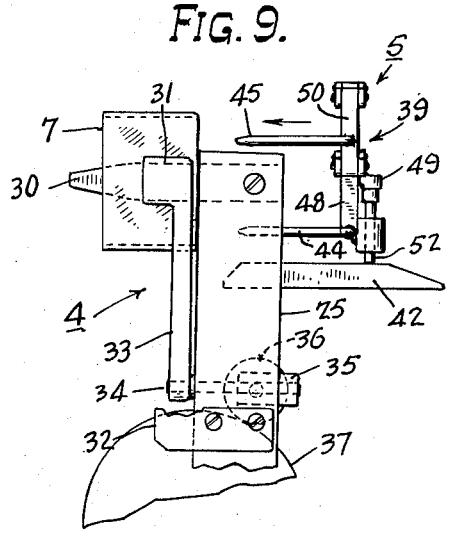
Fig. 9 is an enlarged detail elevation showing the approach of the two finger head towards the spear.
Figure 10:
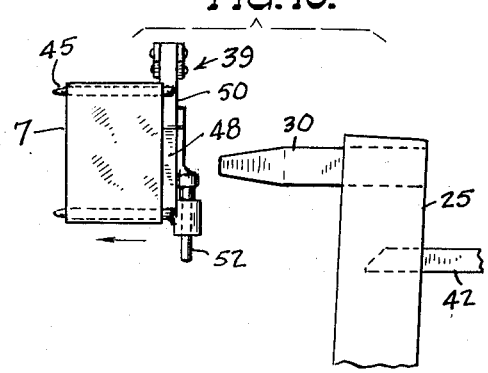
Fig. 10 is a similar view showing the two finger head leaving the spear and carrying the seal.

Lever 49 is actuated by a pin 52 depending from the inner end thereof and which rides on cams 42 and 43 as the head 39 rotates. Actuation of the inner end of lever 49 by cams 42 and 43 forces the outer end of the lever downwardly against spring 51, thereby pulling arm 47 downwardly to contract fingers 44 and 45 as shown in dotted lines in Fig. 8 and in full in Fig. 9. Release of pin 52 from either cam 42 or 43 as hub 41 continues to rotate results in the expansion or separation of fingers 44 and 45 by spring 51 as shown in full in Fig. 8 and in Fig. 10.

The drive 6 for the several parts of the apparatus is adapted to oscillate disc 13 by actuating crank 17, to actuate slide valve 23, drive shaft 26 by means of chain 29, oscillate cam disc 37 by actuating crank 38, and to rotate hub 41 to drive the transfer mechanism, all in timed sequence to effect stripping of a seal 7 from the magazine 2 and pickoff of successive seals by spears 30 and pickup of the seals by the fingers 44 and 45 of transfer heads 39.

For this purpose the drive 6 comprises a motor 53 disposed in base 1 and connected to pulley 54 on shaft 55 by means of a belt 56.

Shaft 55 drives the main drive shaft 57 by means of a chain 58 and suitable sprockets on the shafts. In addition shaft 55 is geared to drive a shaft 59 which carries a crank 60 connected by a link 61 to crank 38 for actuating cam disc 37 to effect rapid clamping and unclamping of seals 7 on spears 30.

The main drive shaft 57 has an eccentric 62 on the rear end thereof actuating a push rod 63 which in turn actuates the slide valve 23.

A chain 64 connects a sprocket 65 on the main drive shaft 57 to a sprocket 66 driving beveled gears 67 which in turn drive a vertical shaft 68 upon the upper end of which hub 41 is mounted, to drive the latter.

The forward end of main shaft 57 carries a beveled differential gear assembly wherein the input gear 69 is secured to shaft 57 and output gear 70 is secured to a shaft 71 disposed parallel and axially aligned with shaft 57. The intermediate gears 72 of the differential gear assembly are rotatable upon a transverse rod 73 which extends upwardly to serve as a crank tending to increase or decrease the rotation of the output gear 70 as rod 73 is moved either in the direction of rotation of gear 69 or counter thereto, respectively.

Crank 73 is actuated periodically in synchronism with the rotation of shaft 57 by means of a crank 74 on the forward end of shaft 55 and link 75 connecting cranks 73 and 74.

Shaft 71 drives a counter shaft 76 by means of a chain 77 and suitable sprockets on both shafts. Counter shaft 76 drives the oscillating disc 13 by means of a crank 78 on the end of shaft 76, link 79 and the crank 17 on shaft 15.

Counter shaft 76 also drives the rotating arms 25 by means of the chain 29.

By employing chains and gears for the drive, all parts of the apparatus are kept in timed relation. The relative speeds of the several operations will be as needed. For instance, both the disc 13 carrying the stripper member 14, and the rotary arms 25 carrying the spears 30 will rotate through 90° substantially simultaneously and will dwell during that portion of the cycle when slide valve 23 and clamp 31 are being actuated. This dwell is obtained by the differential gearing actuated by crank 74. The clamps 31 are actuated by crank 60 in timed sequence to the dwell of members 13 and 25. Likewise, slide valve 23 is actuated by eccentric 62 during the dwell.

The dwell referred to for disc 13 is a complete stop preparatory to a reversal of the disc, and is obtained by making the dead center for crank 78 correspond substantially to the dwell in movement produced by crank 74 and the differential gearing. The dwell referred to for arms 25 need not be a complete stop, but should be at least a very substantial reduction in speed for the spears 30.

By employing the differential gearing and cranks to provide the several motions it is possible to have harmonic changes in speed which give smooth acceleration and deceleration of the several parts and whereby the seal 7 is protected against abuse from inertia forces.

Alignment of the several parts may be maintained more readily by the employment of rotary bearings which can be adjusted for wear without interfering with alignment.

The design is adapted to the employment of two magazines and of four spears to obtain greater capacity for the machine.

Various embodiments of the invention may be employed within the scope of the following claims which particularly point out and distinctly claim the subject matter regarded as the invention.

I claim:

1. In apparatus of the class described, the combination comprising a magazine trough for receiving packs of flat folded tubular seals, a rotationally oscillating member disposed on an axis substantially parallel to said magazine trough and with the open discharge end of said magazine trough closely adjacent the flat face of said member near the outer circumference thereof to retain the seals in the trough, a stripper member on the face of said oscillating member and adapted to carry a seal from the end of said magazine to a pick-off station, means to oscillate said first named member to effect alternate positioning of said stripper member in registry with the magazine and with the pick-off station, and means to effect stripping of the end seal from the magazine by the stripping member as said oscillating member rotates in a direction to move said stripper member from the magazine to the pick-off station.

2. The apparatus of claim 1 in which said second named means comprises suction means, and means to operate the same in synchronism with the oscillation of said first named member.

3. The apparatus of claim 1 in which said second named means comprises suction means adapted to hold one wall of the respective seal flat against said stripper member, and means to operate said suction means in synchronism with the oscillation of said first named member, and means are provided to take off the seal from said stripper means as it reaches said pick-off station, said last named means comprising a spear adapted to enter and to open the seal, and means to move said spear into the seal while the latter is at the pick-off station and while said suction means holds the seal in place, said operating means serving to release the suction on the seal after entrance of the spear to provide for removal and transfer of the seal by said spear.

4. In apparatus of the class described, positioning means having a flat surface adapted to receive successive flat folded tubular seals thereagainst in a predetermined position with a given orientation for subsequent transfer, means to secure the successive seals flat against said surface with the seal closed and with the outer wall of the seal free to flex to open the same, rotary means carrying a spear thereon facing forwardly in a circular path of movement and disposed accurately relative to said predetermined seal position to effect entrance of the spear into the closed slit end of the seal as said rotary means carries the spear in said circular path and toward said position, and means to release said seal from said flat surface and to secure the seal upon said spear for removing and transferring the seal from said first named positioning means as said rotary means continues to move the spear in said circular path past said predetermined position.

5. The apparatus of claim 4, and means to drive said rotary means and to effect a reduction in speed of the same as the spear enters the seal and to accelerate the same upon picking up of the seal by the spear.

6. The apparatus of claim 4 in which said securing means includes suction means to retain the seal in said predetermined position, and said rotary means includes means to drive the same and to effect a dwell therein as the spear enters the seal, and said last named means includes means to release said suction means to provide picking up of the seal by the spear as said rotary means accelerates from said dwell.

7. The apparatus of claim 4 in which said securing means includes suction means to retain the seal in said predetermined position, and said rotary means includes means to drive the same and to effect a dwell therein as the spear enters the seal, and said last named means includes means to actuate said securing means during dwell of the rotary means, and means to release said suction means to provide picking up of the seal by the spear as said rotary means accelerates from said dwell.

8. The apparatus of claim 4 in which said last named means comprises a clamp carried by said rotary means and disposed to clamp the seal upon said spear.

9. The apparatus of claim 4 in which said last named means comprises a clamp carried by said rotary means and disposed to clamp the seal upon said spear, means to maintain said clamp normally closed, and cam means to open said clamp as the spear approaches a seal.

10. The apparatus of claim 4 in which said rotary means is adapted to carry the seal upon said spear to a discharge position, said securing means comprises a clamp carried by said rotary means and disposed to clamp the seal upon said spear, means to maintain the clamp closed upon the seal during transfer of the seal to said discharge position, means to open the clamp at said discharge position for the seal, and means to pick the seal off from said spear at said discharge position.

11. The apparatus of claim 4 in which said rotary means is adapted to carry the seal upon said spear to a discharge position and includes means to drive the same and to effect a dwell in the rotation thereof as the seal approaches said discharge position; said securing means comprises a clamp carried by said rotary means and disposed to clamp the seal upon said spear, means to maintain the clamp closed upon the seal during transfer of the seal to said discharge position, and means to open the clamp at said discharge position for the seal; and means to pick the seal off from said spear at said discharge position.

12. In apparatus of the class described, the combination comprising a magazine trough for receiving packs of flat folded tubular seals and having an open end for stripping of individual seals one by one therefrom, a rotationally oscillating member having an axis parallel to said trough and spaced laterally therefrom and an arcuate face lying in a plane normal to the axis and adapted to constitute the end for said trough to confine the seals therein, a recessed stripper face at the upper end of said arcuate face having vacuum ports therein for suctionally holding a seal thereto when said member is oscillated to a position where said stripper face registers centrally with the end seal in said magazine, a guide extending across the top of the seals in said trough and having its edge spaced from said recessed stripper face a distance greater than the total thickness of the central portion of a folded seal and substantially less than the total thickness of two seals and from said member face a distance substantially less than the total thickness of a folded seal, said member being adapted to lift the end seal while held by vacuum to said stripper face to a pick-off station at the top of the member, means to oscillate said member to present said stripper face alternately at said pick-off station and in registry with the end of said magazine, means to pick off a seal from said stripper face at said pick-off station, and means to apply vacuum to said stripper face during lifting of the successive seals and to release the vacuum to release the seal at said pick-off station in predetermined relation to the actuation of said pick-off means.

13. In apparatus of the class described, a magazine trough adapted to contain a pack of flat members on edge and having an open end for presenting the end member for stripping therefrom, a rotationally oscillating stripper member having a stripper face extending in a plane normal to the axis thereof and to said trough at the open end thereof and adapted to lift successive flat members by movement thereof in said plane from the end of said magazine to a pick-off station, and means including ports in said face and a conduit connecting the same through the body of said member to a vacuum source to secure the seal to said face.

14. The construction of claim 13 in which a plurality of vacuum ports are provided in said stripper face and a network of grooves in the face joins the ports and extends beyond the outer ports to provide suction at the end edges of the member being lifted.

15. The construction of claim 13 in which a valve is provided in said conduit for alternately connecting said ports to said vacuum source and to the air, and means to actuate said valve in correlation to the oscillation of said stripper member to effect lifting of the successive members and release of the same at the pick-off station.

16. The construction of claim 13 which is adapted to strip successive flat folded seals from the magazine and in which spear means are adapted to enter the end of the seal to pick the seal off from said stripper face at said pick-off station, means to clamp the seal upon the spear, and means to disconnect said ports from said vacuum face after said clamping operation to provide for stripping of the stripper face.

References Cited in the file of this patent

UNITED STATES PATENTS

| | | |
|---|---|---|
| 354,094 | Brown | Dec. 14, 1886 |
| 1,139,070 | Phelps | May 11, 1915 |
| 1,277,494 | Shimp | Sept. 3, 1918 |
| 1,331,235 | Bristow | Feb. 17, 1920 |
| 1,352,411 | Hutton | Sept. 7, 1921 |
| 1,440,856 | Westcott | Jan. 2, 1923 |
| 1,898,535 | Haupt et al. | Feb. 21, 1933 |
| 2,018,373 | Maxwell | Oct. 22, 1935 |
| 2,579,458 | Allen et al. | Dec. 25, 1951 |
| 2,601,480 | Williams | June 24, 1952 |
| 2,615,492 | Holmwood et al. | Oct. 28, 1952 |
| 2,630,956 | Pomeroy et al. | Mar. 10, 1953 |
| 2,652,963 | Pomeroy | Sept. 22, 1953 |
| 2,654,520 | Allen et al. | Oct. 6, 1953 |
| 2,747,769 | Erickson | May 29, 1956 |

FOREIGN PATENTS

| | | |
|---|---|---|
| 628,262 | Germany | Mar. 31, 1936 |
| 895,842 | Germany | Nov. 5, 1953 |